US012388196B2

(12) United States Patent
Hamada et al.

(10) Patent No.: US 12,388,196 B2
(45) Date of Patent: Aug. 12, 2025

(54) SHIELDED ELECTRICALLY CONDUCTIVE PATH

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kazuaki Hamada, Mie (JP); Yusuke Kojima, Mie (JP); Atsushi Murata, Mie (JP)

(73) Assignees: AUTONETWORKS TECHNOLOGIES, LTD., Mie (JP); SUMITOMO WIRING SYSTEMS LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 370 days.

(21) Appl. No.: 17/924,849

(22) PCT Filed: May 6, 2021

(86) PCT No.: PCT/JP2021/017320
§ 371 (c)(1),
(2) Date: Nov. 11, 2022

(87) PCT Pub. No.: WO2021/241147
PCT Pub. Date: Dec. 2, 2021

(65) Prior Publication Data

US 2023/0198171 A1 Jun. 22, 2023

(30) Foreign Application Priority Data

May 27, 2020 (JP) ................................ 2020-092133

(51) Int. Cl.
*H01R 4/18* (2006.01)
*H01B 7/18* (2006.01)
(Continued)

(52) U.S. Cl.
CPC ................ *H01R 4/18* (2013.01); *H01B 7/18* (2013.01); *H01R 13/6581* (2013.01); *H01R 13/6593* (2013.01)

(58) Field of Classification Search
CPC .. H01R 4/18; H01R 13/6581; H01R 13/6593; H01B 7/18
See application file for complete search history.

(56) References Cited

U.S. PATENT DOCUMENTS 3,670,293 A * 6/1972 Garver ................ H01R 9/0518 439/585
5,409,400 A * 4/1995 Davis .................... H01R 24/60 439/906
(Continued)

FOREIGN PATENT DOCUMENTS

JP H1174036 A * 3/1999 .......... H01R 9/0518
JP 2000-012162 A 1/2000
(Continued)

OTHER PUBLICATIONS

International Search Report issued on Jul. 6, 2021 for WO 2021/241147 A1 (4 pages).

*Primary Examiner* — Peter G Leigh
(74) *Attorney, Agent, or Firm* — Venjuris, P.C.

(57) ABSTRACT

It is aimed to reduce a diameter. A shielded electrically conductive path is provided with a shielded cable configured such that a core wire is surrounded with a shield layer, and a shield terminal including an inner conductor to be connected to the core wire and an outer conductor formed with a crimping portion in the form of an open barrel. The crimping portion includes a first crimp portion formed with
(Continued)

a projection-like first locking portion and a second crimp portion formed with a second locking portion, and is crimped to an outer surface of the shield layer with the first locking portion locked to the second locking portion. A locking margin of the first locking portion and the second locking portion in a radial direction is within a plate thickness range of the second crimp portion.

6 Claims, 10 Drawing Sheets

(51) Int. Cl.
*H01R 13/6581* (2011.01)
*H01R 13/6593* (2011.01)

(56) References Cited

U.S. PATENT DOCUMENTS

| | | | | |
|---|---|---|---|---|
| 6,059,607 A * | 5/2000 | Wilson | H01R 13/648 | 439/607.47 |
| 6,533,609 B2 * | 3/2003 | Koide | H01R 9/0518 | 439/585 |
| 7,422,480 B1 * | 9/2008 | Musick | H01R 9/0518 | 439/879 |
| 2016/0093984 A1 * | 3/2016 | Iwamoto | H01R 13/65915 | 439/607.55 |
| 2017/0201034 A1 * | 7/2017 | Hikosaka | H01R 13/6473 | |
| 2020/0127421 A1 * | 4/2020 | Jones | H01R 4/188 | |
| 2020/0212604 A1 | 7/2020 | Hamada et al. | | |

FOREIGN PATENT DOCUMENTS

| | | | | |
|---|---|---|---|---|
| JP | 2002208459 A | * | 7/2002 | H01R 4/184 |
| JP | 2002-216916 A | | 8/2002 | |
| JP | 2006244815 A | * | 9/2006 | |
| JP | 2010-170934 A | | 8/2010 | |
| JP | 2014056671 A | * | 3/2014 | |
| JP | 2014060105 A | * | 4/2014 | |
| JP | 2017228385 A | * | 12/2017 | H01B 7/00 |
| JP | 2018078017 A | * | 5/2018 | |
| JP | 2018125242 A | * | 8/2018 | H01R 13/502 |

* cited by examiner

SHIELDED ELECTRICALLY CONDUCTIVE PATH

CROSS REFERENCE TO RELATED APPLICATIONS

This application is a national phase of PCT application No. PCT/JP2021/017320, filed on 6 May 2021, which claims priority from Japanese patent application No. 2020-092133, filed on 27 May 2020, all of which are incorporated herein by reference.

TECHNICAL FIELD

The present disclosure relates to a shielded electrically conductive path.

BACKGROUND

Patent Document 1 discloses a structure for crimping a U-shaped crimp portion formed in an outer conductor terminal to the outer periphery of a shield conductor of a shielded cable. A first hook-like piece bent into a folded state is formed on one end part of the crimp portion, and a second hook-like piece bent into a folded state is formed on the other end part of the crimp portion. With the crimp portion crimped to the shielded cable, the expansive deformation of the crimp portion is prevented by the engagement of the first and second hook-like pieces.

PRIOR ART DOCUMENT

Patent Document

Patent Document 1: JP 2014-060105 A

SUMMARY OF THE INVENTION

Problems to be Solved

Since the first hook-like piece in the folded state and the second hook-like piece in the folded state are engaged to overlap in four layers in a radial direction, there is a problem that a crimped part by the crimp portion is enlarged in the radial direction.

A shielded electrically conductive path of the present disclosure was completed on the basis of the above situation and aims to reduce a diameter.

Means to Solve the Problem

The present disclosure is directed to a shielded electrically conductive path with a shielded cable configured such that a core wire is surrounded with a shield layer, and a shield terminal including an inner conductor to be connected to the core wire and an outer conductor formed with a crimping portion in the form of an open barrel, the crimping portion including a first crimp portion formed with a projection-like first locking portion and a second crimp portion formed with a second locking portion, the crimping portion being crimped to an outer surface of the shield layer with the first locking portion locked to the second locking portion, and a locking margin of the first locking portion and the second locking portion in a radial direction being within a plate thickness range of the second crimp portion.

Effect of the Invention

According to the present disclosure, it is possible to reduce a diameter.

DETAILED DESCRIPTION TO EXECUTE THE INVENTION

Description of Embodiments of Present Disclosure

Figure 1:
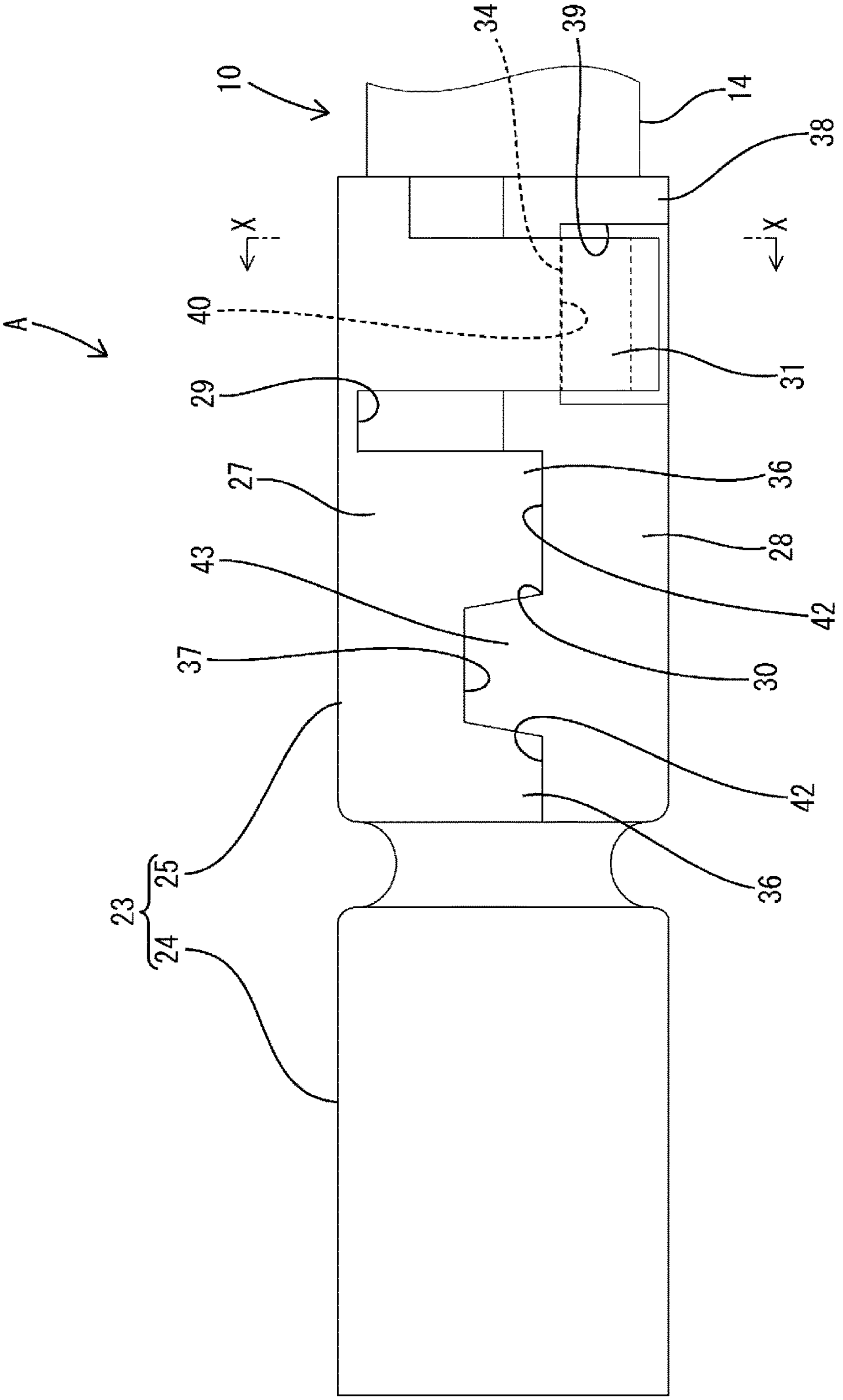
FIG. 1 is a plan view of a shielded electrically conductive path of a first embodiment.

First, embodiments of the present disclosure are listed and described.

(1) The shielded electrically conductive path of the present disclosure is provided with a shielded cable configured such that a core wire is surrounded with a shield layer, and a shield terminal including an inner conductor to be connected to the core wire and an outer conductor formed with a crimping portion in the form of an open barrel, the crimping portion including a first crimp portion formed with a projection-like first locking portion and a second crimp portion formed with a second locking portion, the crimping portion being crimped to an outer surface of the shield layer with the first locking portion locked to the second locking portion, and a locking margin of the first locking portion and the second locking portion in a radial direction being within a plate thickness range of the second crimp portion. Since the locking margin of the first locking portion and the second locking portion in the radial direction is within the plate thickness range of the second crimp portion in the shielded electrically conductive path of the present disclosure, a diameter can be reduced as compared to the case where the locking margin of the first locking portion and the second locking portion in the radial direction is secured outside plate thickness ranges of the first and second crimp portions.

(2) Preferably in (1), the first locking portion is formed by bending a tip part of the first crimp portion into a folded state. According to this configuration, locking strength is high as compared to a first locking portion formed by bending a tip edge part of the first crimp portion at a right angle.

(3) Preferably in (1), the first locking portion is formed by cutting and raising a part of the first crimp portion in a plate thickness direction of the first crimp portion. According to this configuration, manufacturing cost can be reduced as compared to the case where the first locking portion is formed by bending a part flush with and extending from an outer peripheral edge of the first crimp portion.

(4) Preferably in (1), the first locking portion is formed by bending the first crimp portion along a folding line extending in a circumferential direction. According to this configuration, since the first locking portion has high rigidity against an external force in the circumferential direction, it is possible to prevent the expansive deformation of the crimping portion due to the deformation of the first locking portion.

(5) Preferably, the first crimp portion is layered on an outer peripheral side of the first crimp portion. According to this configuration, since a locked part of the first locking portion to the second locking portion is not exposed on the outer peripheral surface of the second crimp portion, the locked part of the first locking portion to the second locking portion can be prevented from being separated from the second locking portion due to the interference of an external matter.

(6) Preferably, the first crimp portion and the second crimp portion are formed with displacement restricting portions capable of restricting relative displacements of the first crimp portion and the second crimp portion in an axial direction by coming into contact with each other. According to this configuration, since relative displacements of the first and second crimp portions in the axial direction are prevented by the displacement restricting portions, a locked state of the first and second locking portions can be maintained.

DETAILS OF EMBODIMENTS OF PRESENT DISCLOSURE

First Embodiment

Figure 2:
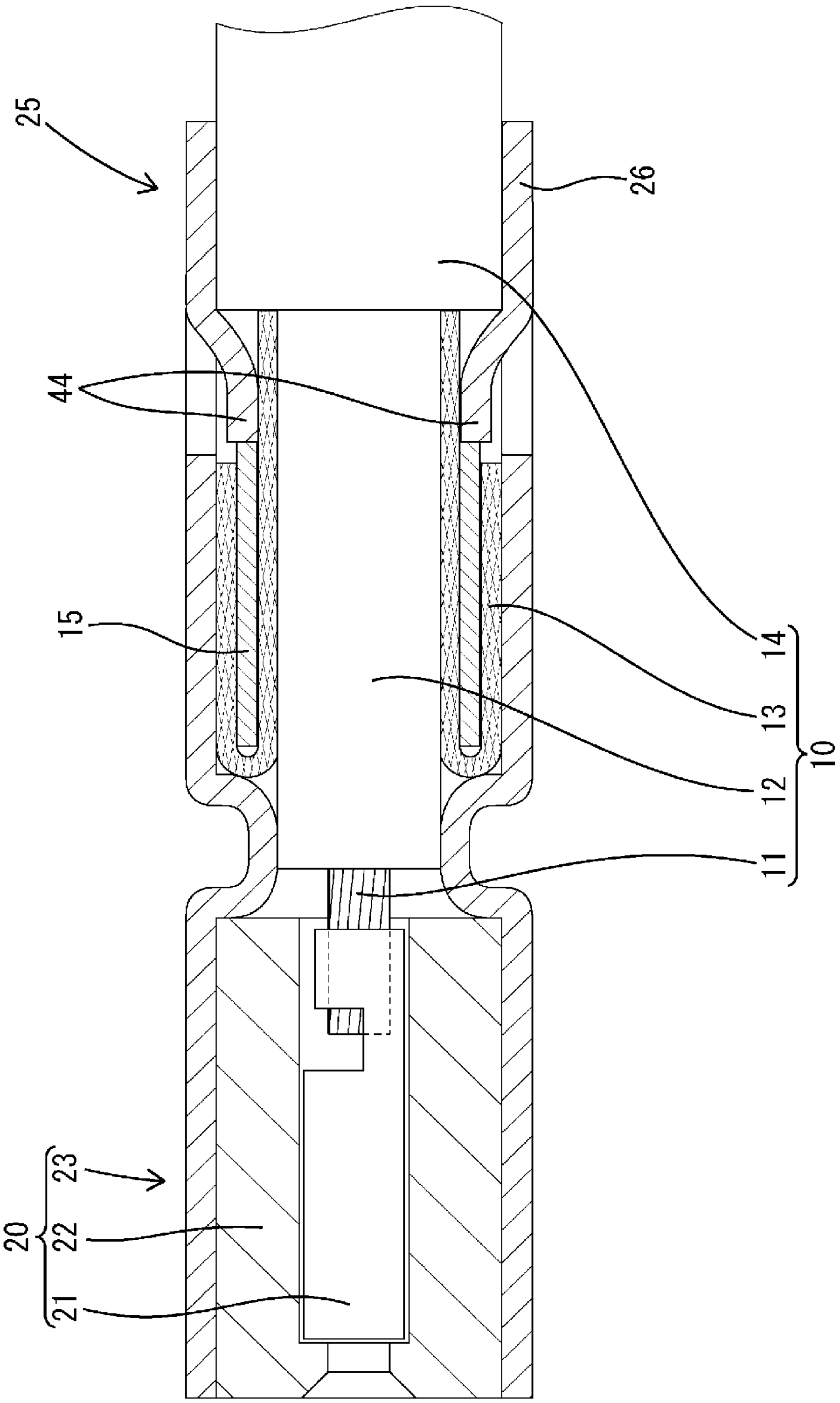
FIG. 2 is a side view in section of the shielded electrically conductive path.
Figure 3:
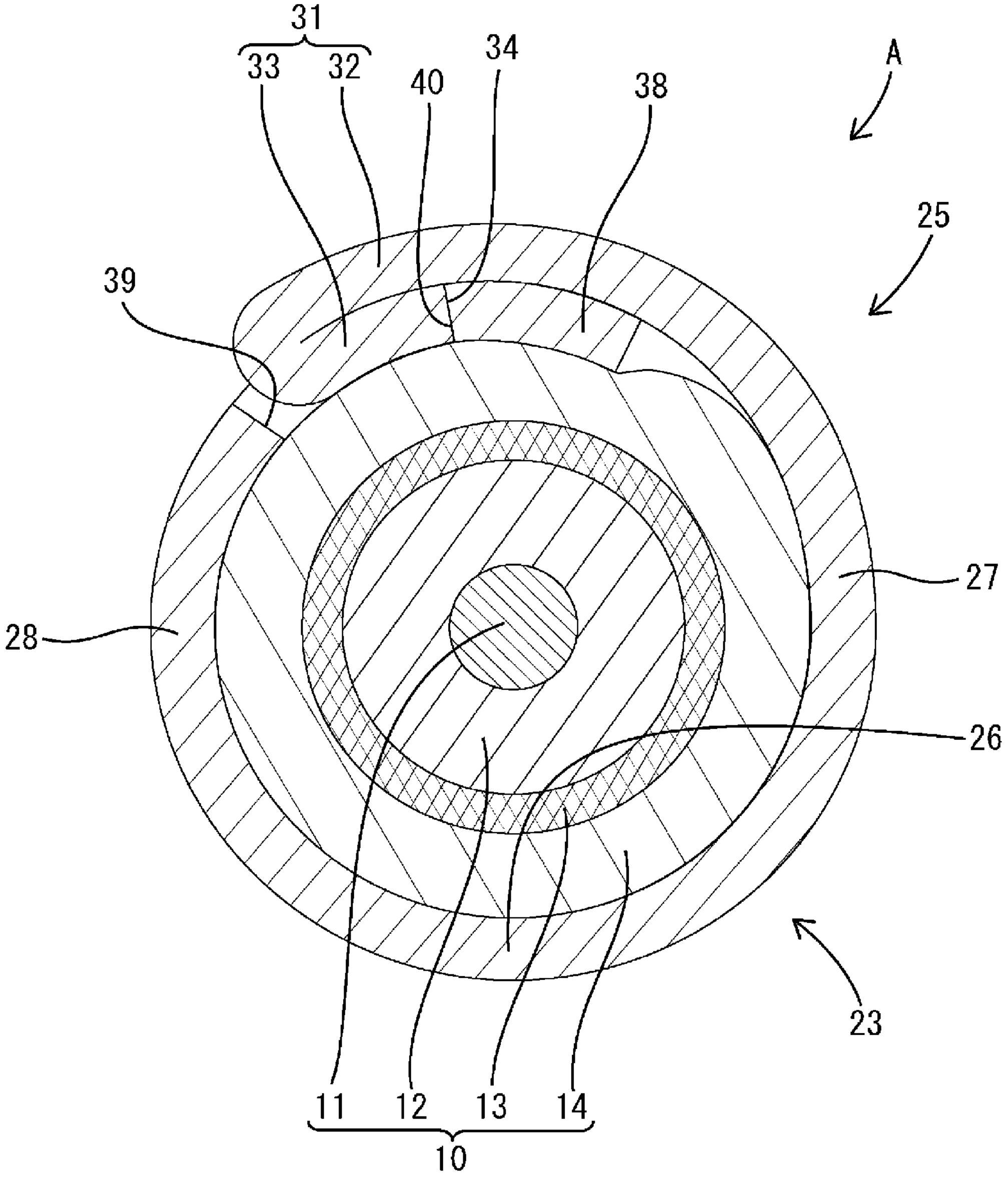
FIG. 3 is a section along X-X of FIG. 1.

A first specific embodiment of the present disclosure is described below with reference to FIGS. 1 to 5. Note that the present invention is not limited to these illustrations and is intended to be represented by claims and include all changes in the scope of claims and in the meaning and scope of equivalents. In this embodiment, a left side in FIGS. 1 and 2 is defined as a front side concerning a front-rear direction. Upper and lower sides shown in FIGS. 2 and 3 are directly defined as upper and lower sides concerning a vertical direction.

A shielded electrically conductive path A of the first embodiment is provided with a shielded cable 10, a sleeve 15 externally fit to the shielded cable 10 and a shield terminal 20 connected to a front end part of the shielded cable 10 using the sleeve 15. The shielded cable 10 is such that a core wire 11 is surrounded with an insulation coating 12, a tubular shield layer 13 is overlapped on the outer periphery of the insulation coating 12 and the outer periphery of the shield layer 13 is surrounded with a sheath 14.

A front end part of the shielded cable 10 is arranged to align an axial direction with the front-rear direction. In the following description, the front-rear direction and the axial direction are used as synonyms. As shown in FIG. 2, the sheath 14 and the insulation coating 12 are removed to expose the core wire 11 forward of the insulation coating 12 and the sheath 14 is removed to expose the shield layer 13. The electrically conductive and round tubular sleeve 15 made of metal or the like is externally fit to the outer periphery of the shield layer 13. A front end part of the shield layer 13 is folded rearward to cover the outer periphery of the sleeve 15.

The shield terminal 20 includes an inner conductor 21 connected to a front end part of the core wire 11, a dielectric 22 accommodating the inner conductor 21 and an outer conductor 23 mounted on the dielectric 22 while surrounding the outer periphery of the dielectric 22. The outer conductor 23 includes a body portion 24 in the form of a rectangular tube constituting a front end part of the outer conductor 23 and a hollow cylindrical crimping portion 25 connected to the rear end of the body portion 24 and constituting a rear end part of the outer conductor 23. An axis of the outer conductor 23 and that of the shielded cable 10 are coaxial and oriented in the front-rear direction. The inner conductor 21 and the dielectric 22 are accommodated in the body portion 24.

Figure 4:
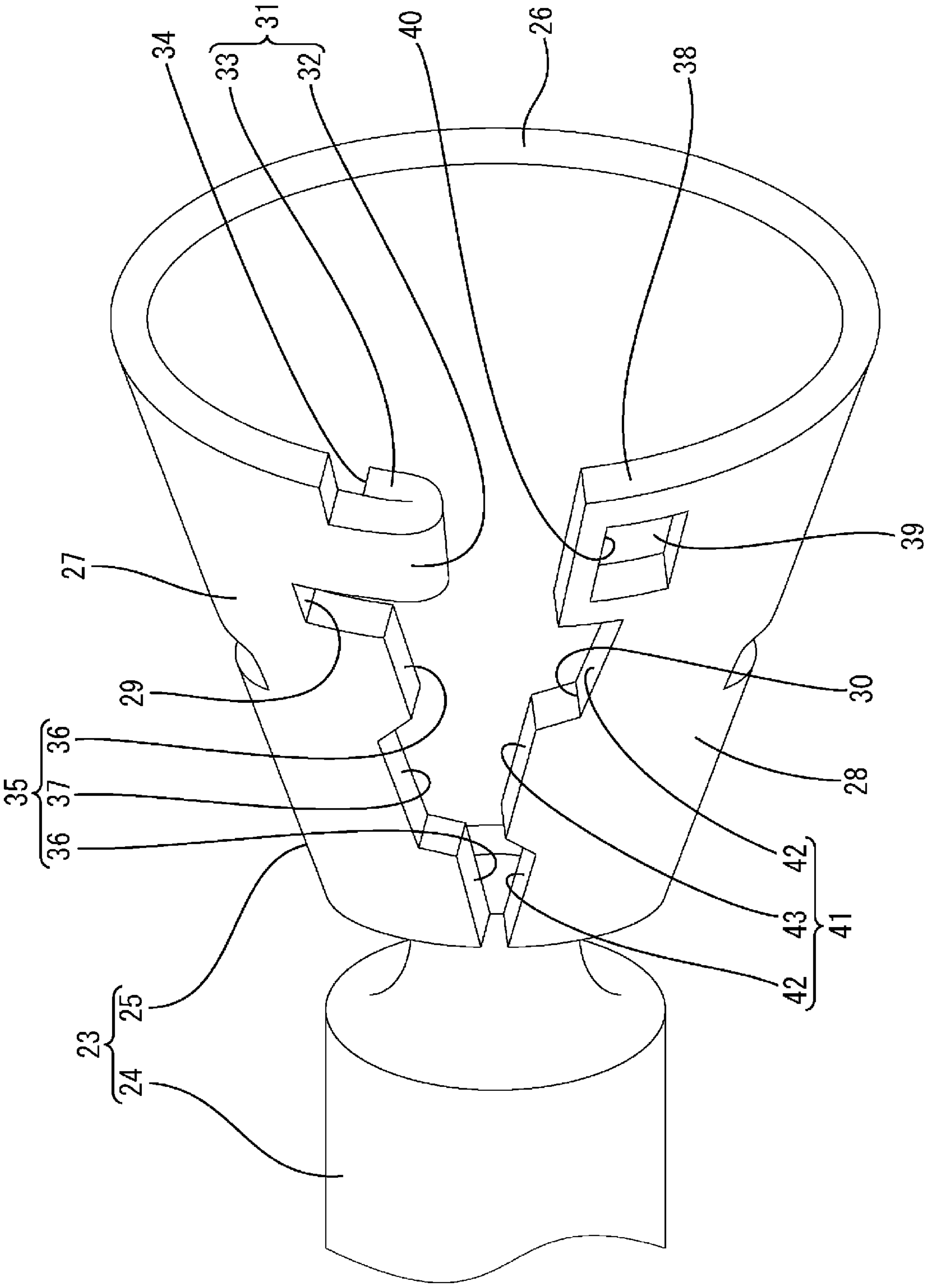
FIG. 4 is a perspective view showing the form of a crimping portion before being crimped.
Figure 5:
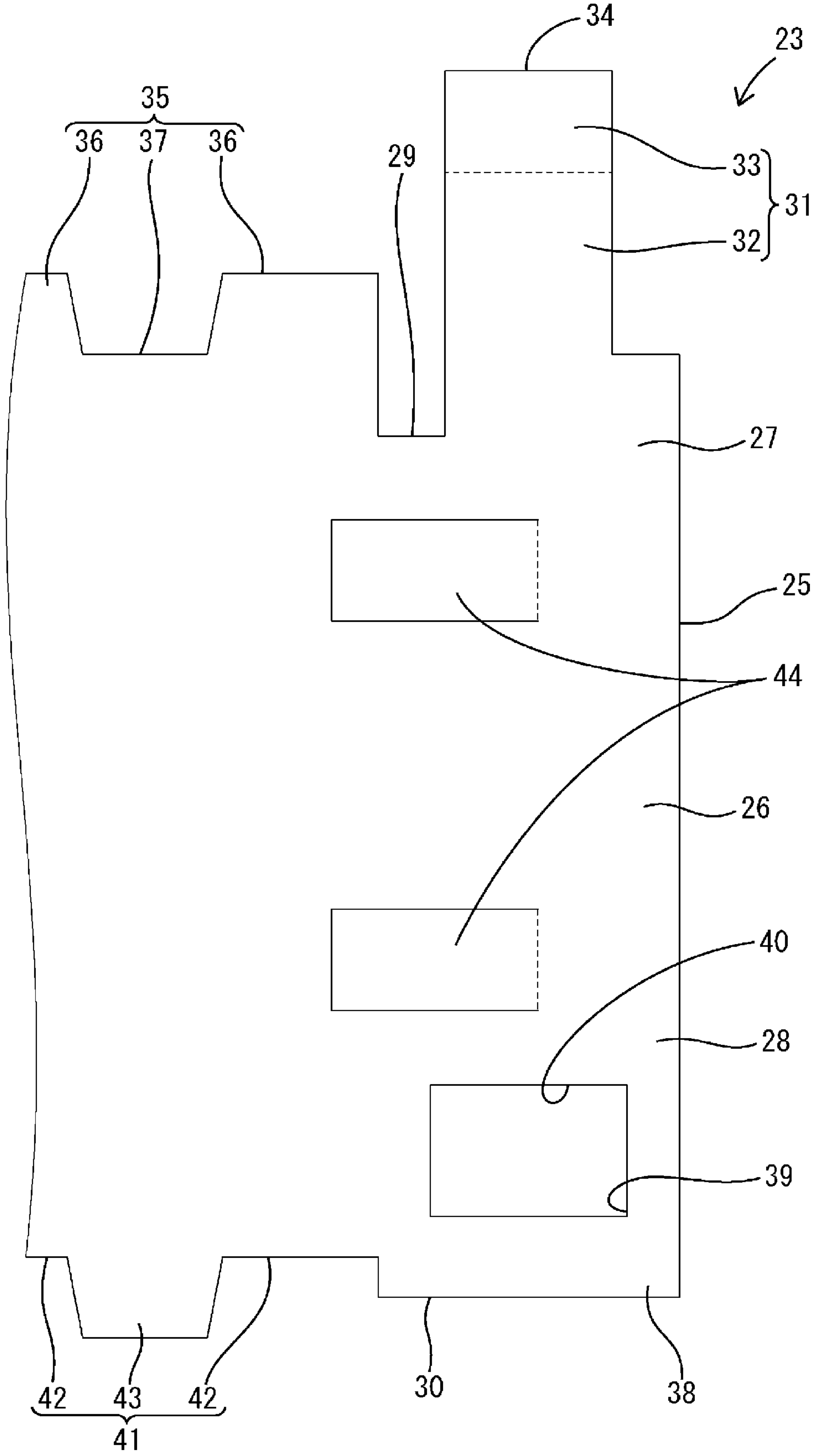
FIG. 5 is a development of the crimping portion.

The crimping portion 25 is a part for fixing the outer conductor 23 to the outer periphery of the shielded cable 10. The crimping portion 25 includes a base plate portion 26 extending rearward from the rear end of the body portion 24, a first crimp portion 27 extending in one direction along a circumferential direction from the base plate portion 26 and a second crimp portion 28 extending in a direction opposite to the first crimp portion 27 along the circumferential direction from the base plate portion 26. As shown in FIG. 4, in a state where the crimping portion 25 is not crimped to the shielded cable 10, the crimping portion 25 has such a tapered shape to gradually increase a diameter from a front end toward a rear end. A first extending end edge part 29, which is a tip edge part in an extending direction of the first crimp portion 27, and a second extending end edge part 30, which is a tip edge part in the extending direction of the second crimp portion 28, are separated in the circumferential direction.

A first locking portion 31 and a first displacement restricting portion 35 are formed on the first extending end edge part 29. The first locking portion 31 is arranged in a rear end part of the first extending end edge part 29. The first locking portion 31 includes a base portion 32 projecting in the circumferential direction from a rear end part of the extending end edge part 29 toward the second extending end edge part 30, and a folded portion 33 folded in a direction opposite to the circumferential direction from a projecting end of the base portion 32. The base portion 32 is flush and continuous with the first crimp portion 27. In other words, the outer peripheral surface of the base portion 32 and that of the first crimp portion 27 are smoothly continuous, and the inner peripheral surface of the base portion 32 and that of the first crimp portion 27 are smoothly continuous. Therefore, no step is present in the radial direction at a boundary part between the base portion 32 and the first crimp portion 27.

The folded portion 33 is arranged in a state held in close contact with the inner peripheral surface of the base portion 32 or to proximately face the inner peripheral surface of the base portion 32. A width in the axial direction of the folded portion 33 is equal to that of the base portion 32. The folded portion 33 is formed to project further radially inward than the inner peripheral surfaces of the base portion 32 and the first crimp portion 27. The tip surface of the folded portion 33 is arranged radially inwardly of the first crimp portion 27, facing the first crimp portion 27 and the base plate portion 26 in the radial direction, and functions as a first locking surface 34 orthogonal to the circumferential direction. The first locking portion 31 is in the form of a projection projecting radially inward from the first crimp portion 27.

The first displacement restricting portion 35 is formed in a region of the first extending end edge part 29 forward of the first locking portion 31. The first displacement restricting portion 35 includes a pair of first protrusions 36 spaced apart in the front-rear direction and a first recess 37 formed between the both first protrusions 36. The first protrusions 36 are formed to project from the first extending end edge part 29 toward the second extending end edge part 30. The first recess 37 is formed by recessing the first extending end edge part 29.

A second locking portion 38 and a second displacement restricting portion 41 are formed on the second extending end edge part 30. The second locking portion 38 is arranged in a rear end part of the second extending end edge part 30. The second locking portion 38 projects in the circumferential direction from the rear end part of the second extending end edge part 30 toward the first extending end edge part 29. The second locking portion 38 is flush and continuous with the second crimp portion 28. In other words, the outer peripheral surface of the second locking portion 38 and that of the second crimp portion 28 are smoothly continuous, and the inner peripheral surface of the second locking portion 38 and that of the second crimp portion 28 are smoothly continuous. Therefore, no step is present in the radial direction at a boundary part between the second locking portion 38 and the second crimp portion 28.

The second locking portion 38 includes a rectangular opening 39. The opening 39 is cut to penetrate through the second crimp portion 28 from an outer peripheral surface to an inner peripheral surface. The inner peripheral surface of the opening 39 has two inner side surfaces spaced apart in the circumferential direction of the crimping portion 25 and a front surface and a rear surface spaced apart in the axial direction. Out of the two inner side surfaces, the inner side surface closer to the first extending end edge part 29 functions as a second locking surface 40. The second locking surface 40 is arranged only within plate thickness ranges of the second crimp portion 28 and the second locking portion 38. The second locking surface 40 is a surface orthogonal to the circumferential direction and facing toward the second crimp portion 28 and the base plate portion 26 in the circumferential direction.

The second displacement restricting portion 41 is formed in a region of the second extending end edge part 30 forward of the second locking portion 38. The second displacement restricting portion 41 includes a pair of second recesses 42 spaced apart in the front-rear direction and a second protrusion 43 formed between the both second recesses 42. The second recesses 42 are formed by recessing the second extending end edge part 30. The second protrusion 43 is formed to project from the second extending end edge part 30 toward the first extending end edge part 29.

The first crimp portion 27 is formed with a stopper 44 by cutting and raising a part of the first crimp portion 27 to extend radially inward and obliquely forward. The stopper 44 of the first crimp portion 27 is arranged at a position closer to the base plate portion 26 than the first extending end edge part 29. The front end of the stopper 44 of the first crimp portion 27 is located forward of the first locking portion 31. The second crimp portion 28 is formed with a stopper 44 by cutting and raising a part of the second crimp portion 28 to extend radially inward and obliquely forward. The stopper 44 of the second crimp portion 28 is arranged at a position closer to the base plate portion 26 than the second extending end edge part 30. The front end of the stopper 44 of the second crimp portion 28 is located forward of the second locking portion 38.

The crimping portion 25 is crimped to the shielded cable 10 by setting the crimping portion 25 and the front end part of the shielded cable 10 in an applicator (not shown). In a crimping step, the first and second crimp portions 27, 28 are reduced in diameter and deformed and crimped to wind around the outer periphery of the shielded cable 10. With the crimping portion 25 crimped to the shielded cable 10, rear end parts of the first and second crimp portions 27, 28 where the first and second locking portions 31, 38 are formed are externally fit to a front end part of the sheath 14.

In a part of the crimping portion 25 crimped to the sheath 14, the first extending end edge part 29 is overlapped on the outer peripheral surfaces of the second extending end edge part 30 and the second locking portion 38 as shown in FIG. 3. In particular, a base end part of the first locking portion 31 closest to the base plate portion 26 in the circumferential direction is overlapped on the outer periphery of a tip part of the second locking portion 38 most distant from the base plate portion 26 in the circumferential direction. The folded portion 33 is accommodated in the opening 39, and the first and second locking surfaces 34, 40 are in surface contact with each other in the circumferential direction. By a locking action achieved by the contact of the both locking surfaces 34, 40, the first and second crimp portions 27, 28 are prevented from being relatively displaced to be separated in the circumferential direction, and the crimping portion 25 is reliably fixed to the outer periphery of the shielded cable 10.

Regions of the first and second crimp portions 27, 28 forward of the first and second locking portions 31, 38, i.e. regions where the first and second displacement restricting portions 35, 41 are formed, are externally fit to a region forward of the sheath 14 where the shield layer 13 is exposed. With the first protrusions 36 and the second recesses 42 fit and the first recess 37 and the second protrusion 43 fit, the first and second crimp portions 27, 28 are crimped to the outer periphery of the shield layer 13. By the fitting of the first protrusions 36 and the second recesses 42 and the fitting of the first recess 37 and the second protrusion 43, the first and second crimp portions 27, 28 are restricted from being relatively displaced in the axial direction.

The shielded electrically conductive path A of the first embodiment is provided with the shielded cable 10 configured such that the core wire 11 is surrounded with the shield layer 13, and the shield terminal 20. The shield terminal 20 includes the inner conductor 21 to be connected to the core wire 11 and the outer conductor 23 formed with the crimping portion 25 in the form of an open barrel. The crimping portion 25 includes the first crimp portion 27 formed with the projection-like first locking portion 31 and the second crimp portion 28 formed with the second locking portion 32. The crimping portion 25 is crimped to the outer surface of the shield layer 13 with the first locking portion 31 locked to the second locking portion 32. A locking margin of the first and second locking portions 31, 32 in the radial direction, i.e. a locking range of the first and second locking surfaces 34, 40 in the plate thickness directions of the both locking portions 31, 38, is limited within the plate thickness range of the second crimp portion 28 (second locking portion 38).

If the locking margin of the first and second locking portions 31, 38 is secured outside the plate thickness ranges of the first and second crimp portions 27, 28 on an outer peripheral side of the shielded cable 10, a three-layer laminated structure is formed in which a layer of the locking margin of the both locking portions 31, 38 is added to a layer of the first crimp portion 27 and a layer of the second crimp portion 28. Thus, an outer diameter of the shielded electrically conductive path A increases.

In contrast, since the locking margin of the first and second locking portions 31, 38 is secured within the plate thickness range of the second crimp portion 28 in the first embodiment, a two-layer laminated structure composed only of the first and second crimp portions 27, 28 is formed on the outer periphery of the shielded cable 10. Therefore, a reduction in the diameter of the shielded electrically conductive path A is realized in the crimped part of the shielded cable 10 and the crimping portion 25. Since the first locking portion 31 is formed by bending the tip part of the first crimp portion 27 into a folded state, locking strength is high as compared to a first locking portion formed by bending a tip edge part of the first crimp portion 27 at a right angle.

The first extending end edge part 29 of the first crimp portion 27 is layered on an outer peripheral side of the second extending end edge part 30 of the second crimp portion 28. According to this configuration, a locked part (folded portion 33 and first locking surface 34) of the first locking portion 31 to the second locking portion 38 is not exposed on the outer peripheral surface of the second crimp portion 28. Therefore, the locked part (folded portion 33 and first locking surface 34) of the first locking portion 31 to the second locking portion 38 can be prevented from being separated from the second locking portion 38 (second locking surface 40) due to the interference of an external matter.

The first crimp portion 27 is formed with the first displacement restricting portion 35, and the second crimp portion 28 is formed with the second displacement restricting portion 41. By the mutual contact of the first and second displacement restricting portions 35, 41, relative displacements of the first and second crimp portions 27, 28 in the axial direction are restricted, wherefore the locked state of the first and second locking portions 31, 38 can be maintained.

With the crimping portion 25 crimped to the shielded cable 10, a pair of the stoppers 44 are arranged to come into contact with the sleeve 15 from behind or proximately face the sleeve 15 from behind. According to this arrangement, even if the shielded cable 10 is pulled rearward, the rear end of the sleeve 15 butts against the stoppers 44, whereby a relative rearward displacement of the shielded cable 10 with respect to the shield terminal 20 can be prevented.

Second Embodiment

Figure 6:
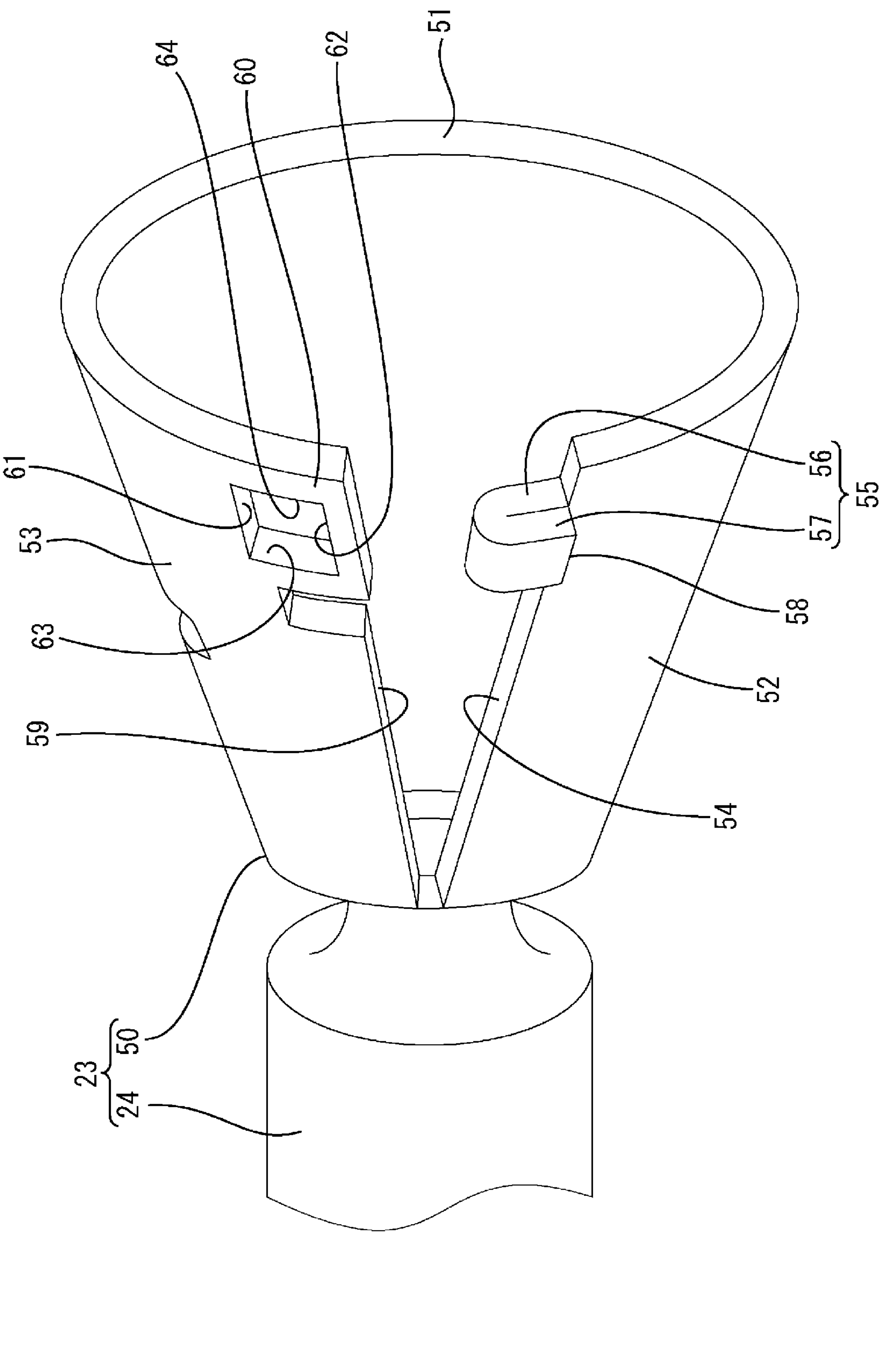
FIG. 6 is a perspective view showing the form of a crimping portion before being crimped in a second embodiment.
Figure 7:
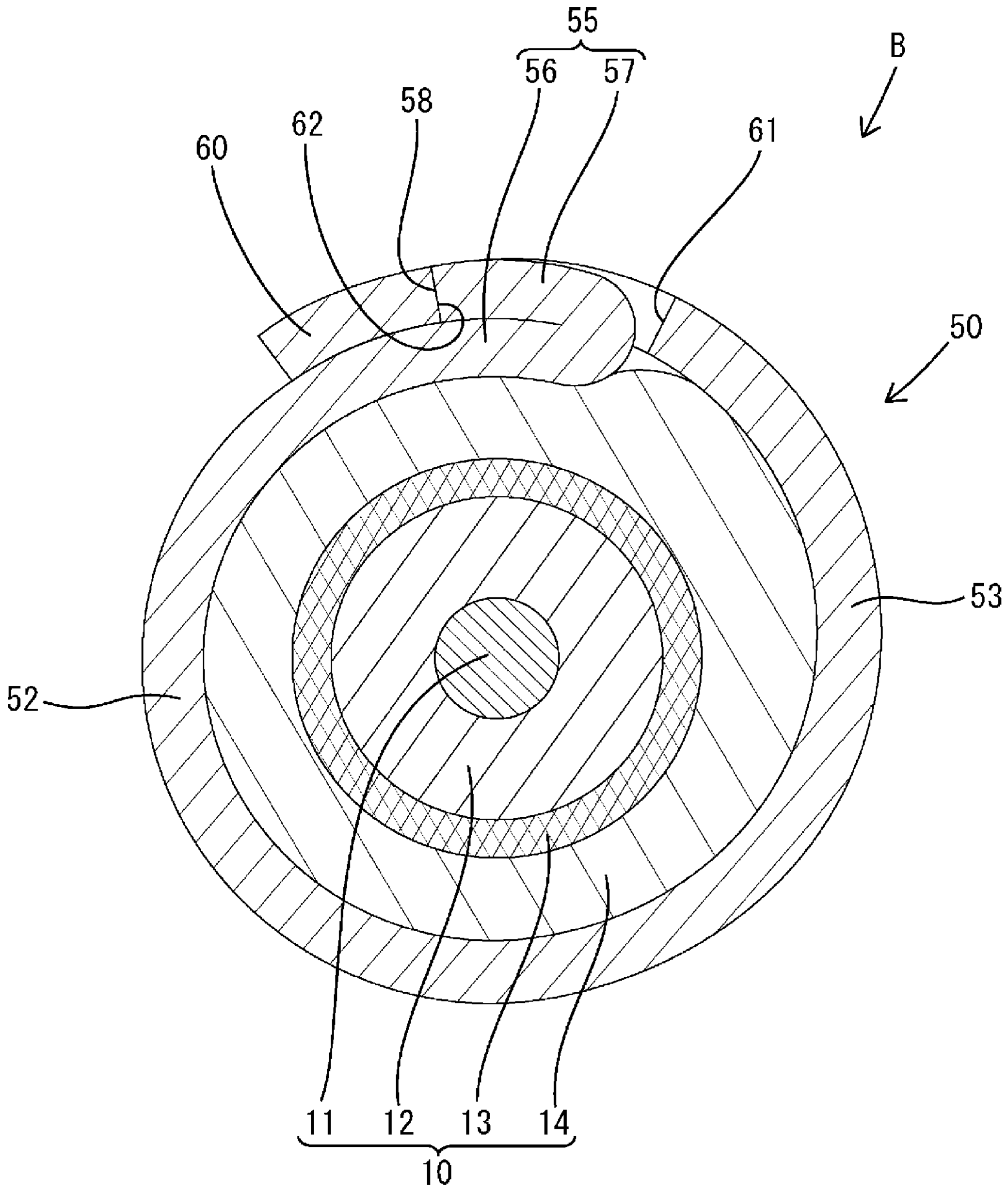
FIG. 7 is a section along X-X of a shielded electrically conductive path of the second embodiment.

A second specific embodiment of the present disclosure is described with reference to FIGS. 6 and 7. A shielded electrically conductive path B of the second embodiment differs from the first embodiment in the configuration of a crimping portion 50. Since the other configuration is the same as in the first embodiment, the same components are denoted by the same reference signs and structures, functions and effects thereof are not described.

The crimping portion 50 includes a base plate portion 51 extending rearward from the rear end of a body portion 24 of an outer conductor 23, a first crimp portion 27 extending in one direction along a circumferential direction from the base plate portion 51 and a second crimp portion 53 extending in a direction opposite to the first crimp portion 52 along the circumferential direction from the base plate portion 51. As shown in FIG. 6, in a state where the crimping portion 50 is not crimped to a shielded cable 10, the crimping portion 50 has such a tapered shape to gradually increase a diameter from a front end toward a rear end.

A first extending end edge part 54, which is a tip edge part in an extending direction of the first crimp portion 52, is formed with a first locking portion 55. The first locking portion 55 includes a base portion 56 projecting in the circumferential direction from a rear end part of the extending end edge part 54 toward a second extending end edge part 59 of the second crimp portion 53, and a folded portion 57 folded in a direction opposite to the circumferential direction from a projecting end of the base portion 56. The base portion 56 is flush and continuous with the first crimp portion 52.

The folded portion 57 is arranged in a state held in close contact with the inner peripheral surface of the base portion 56 or to proximately face the inner peripheral surface of the base portion 56. The folded portion 57 is formed to project further radially outward than the inner peripheral surfaces of the base portion 56 and the first crimp portion 52. The tip surface of the folded portion 57 is facing toward the first crimp portion 52 and the base plate portion 51 in the circumferential direction and functions as a first locking surface 58 orthogonal to the circumferential direction. The first locking portion 55 is in the form of a projection projecting radially outward from the first crimp portion 52.

The second extending end edge part 59, which is a tip edge part in an extending direction of the second crimp portion 53, is formed with a second locking portion 60. The second locking portion 60 extends in the circumferential direction from a rear end part of the second extending end edge part 59 toward the first extending end edge part 54. The second locking portion 60 is flush and continuous with the second crimp portion 53. The second locking portion 60 includes a rectangular opening 61. The opening 61 is cut to penetrate through the second crimp portion 53 from an outer peripheral surface to an inner peripheral surface.

The inner peripheral surface of the opening 61 has two inner side surfaces spaced apart in the circumferential direction of the crimping portion 50 and a front surface 63 and a rear surface 64 spaced apart in an axial direction. Out of the two inner side surfaces, the inner side surface closer to the first extending end edge part 54 functions as a second locking surface 62. The second locking surface 62 is arranged only within plate thickness ranges of the second crimp portion 53 and the second locking portion 60, facing toward the second crimp portion 53 and the base plate portion 51 in the circumferential direction, and orthogonal to the circumferential direction.

With the crimping portion 50 crimped to the shielded cable 10, rear end parts of the first and second crimp portions 52, 53 where the first and second locking portions 52, 60 are formed are externally fit to a front end part of a sheath 14. As shown in FIG. 7, the second locking portion 60 is overlapped on the outer peripheral surface of the first locking portion 55. A tip part of the second locking portion 60 most distant from the base plate portion 51 in the circumferential direction is overlapped on the outer periphery of a base end part of the first locking portion 55 closest to the base plate portion 51 in the circumferential direction.

The folded portion 57 is accommodated in the opening 61, and the first and second locking surfaces 58, 62 are in surface contact with each other in the circumferential direction. By a locking action achieved by the contact of the both locking surfaces 58, 62, the first and second crimp portion 52, 53 are prevented from being relatively displaced to be separated in the circumferential direction and the crimping portion 50 is reliably fixed to the outer periphery of the shielded cable 10.

A front edge part of the folded portion 57 is proximately facing the front surface 63 of the opening 61 from behind, and a rear edge part of the folded portion 57 is proximately facing the rear surface 64 of the opening 61 from front. If an external force for relatively displacing the first crimp portion 52 forward is applied to the first and second crimp portions 52, 53, the front edge part of the folded portion 57 comes into contact with the front surface 63 of the opening 61, thereby preventing a relative displacement of the first crimp portion 52. If an external force for relatively displacing the first crimp portion 52 rearward is applied to the first and second crimp portions 52, 53, the rear edge part of the folded portion 57 comes into contact with the rear surface 64 of the opening 61, thereby preventing a relative displacement of the first crimp portion 52.

Third Embodiment

Figure 8:
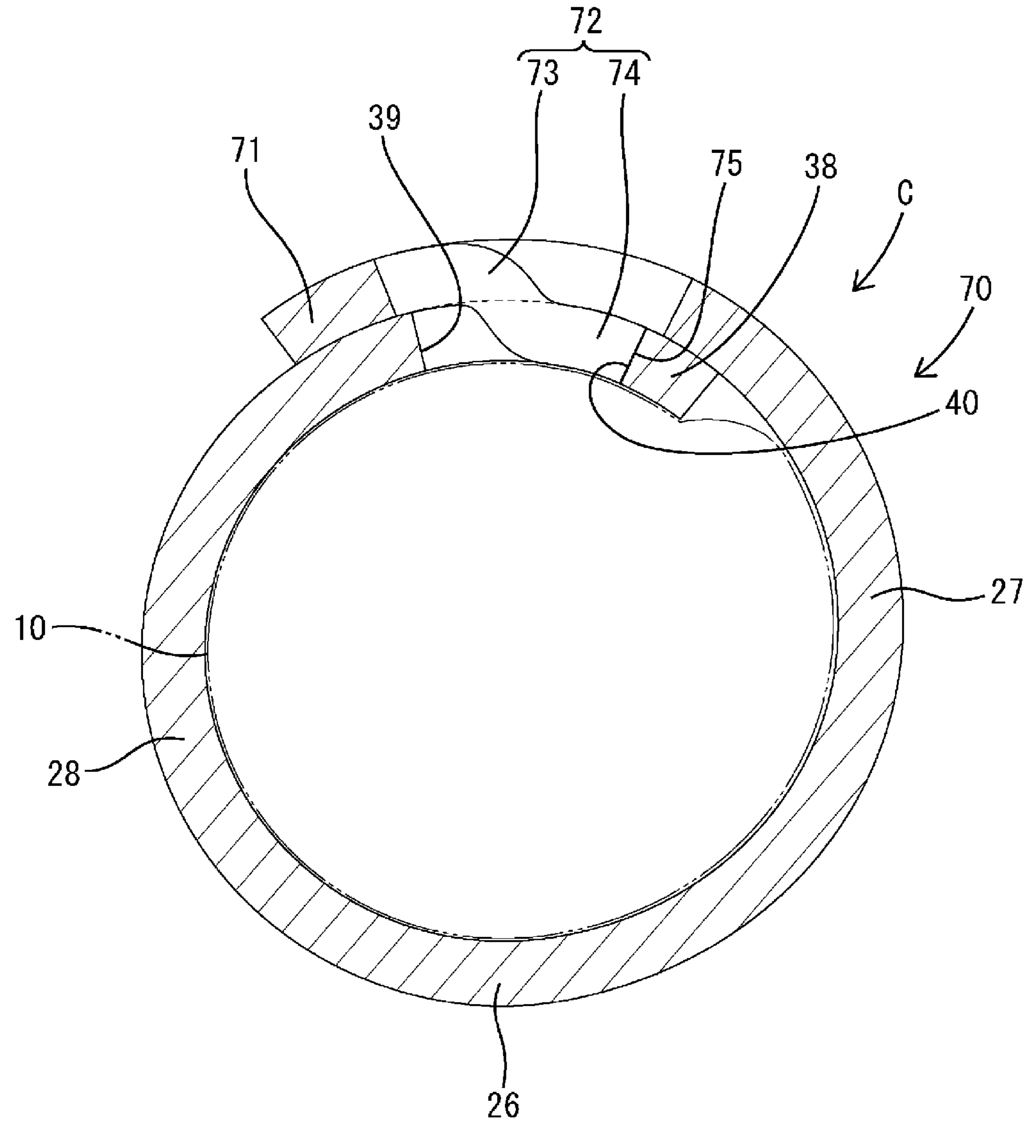
FIG. 8 is a section along X-X of a shielded electrically conductive path of a third embodiment.

A third specific embodiment of the present disclosure is described with reference to FIG. 8. A shielded electrically conductive path C of the third embodiment differs from the first embodiment in the configuration of a first locking portion 71 constituting a crimping portion 70. Since the other configuration is the same as in the first embodiment, the same components are denoted by the same reference signs and structures, functions and effects thereof are not described.

The first locking portion 71 of the third embodiment includes a cut-and-raised piece 72 formed by cutting a part of a first crimp portion 27 (first locking portion 71) and raising the cut part radially inwardly. The cut-and-raised piece 72 includes a bent portion 73 and a butting portion 74. The bent portion 73 projects in a circumferential direction from a tip part of the first locking portion 71 and is bent to project further radially inward than the tip part of the first locking portion 71. The butting portion 74 is formed to extend in the circumferential direction from the projecting end of the bent portion 73 toward a base plate portion 26. A radially inward projection dimension of the butting portion 74 from the first locking portion 71 is equal to a plate thickness of a second locking portion 38 of a second crimp portion 28. The extending end surface of the butting portion 74 functions as a first locking surface 75 orthogonal to the circumferential direction.

With the crimping portion 70 crimped to a shielded cable 10, the first locking portion 71 is overlapped on the outer periphery of the second locking portion 38 and a part of the bent portion 73 and the entire butting portion 74 are accommodated in an opening 39 of the second locking portion 38. The first locking surface 75 butts against a second locking surface 40 of the opening 39 in the circumferential direction. By this butting, the first and second crimp portions 27, 28 are prevented from being expanded and deformed in the circumferential direction and a crimped state of the crimping portion 70 to the shielded cable 10 is maintained.

The first locking portion 71 is formed by cutting and raising a part of the first crimp portion 27 in a plate thickness direction of the first crimp portion 27. The shielded electrically conductive path C of the third embodiment can reduce manufacturing cost as compared to the case where a part flush with and extending from the outer peripheral edge of the first crimp portion 27 is bent.

Fourth Embodiment

Figure 9:
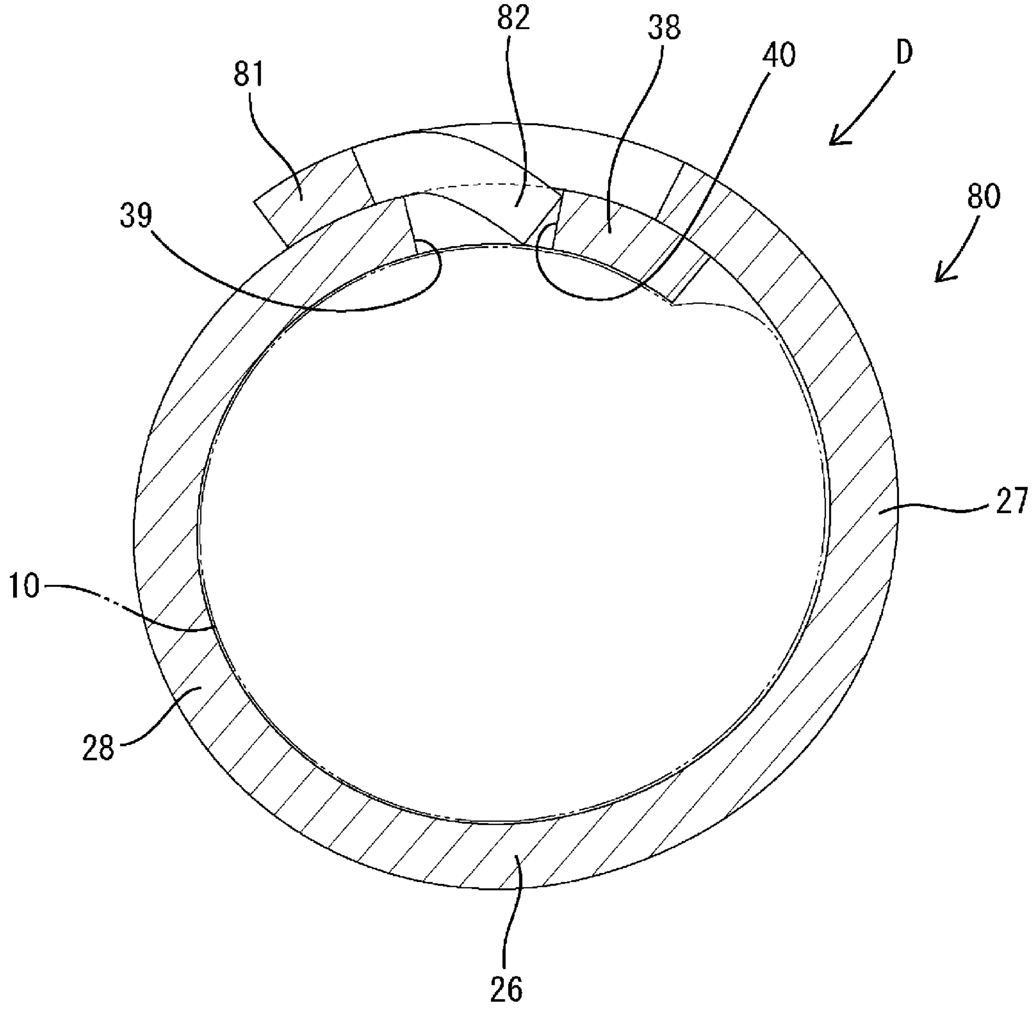
FIG. 9 is a section along X-X of a shielded electrically conductive path of a fourth embodiment.

A fourth specific embodiment of the present disclosure is described with reference to FIG. 9. A shielded electrically conductive path D of the fourth embodiment differs from the first embodiment in the configuration of a first locking portion 81 constituting a crimping portion 80. Since the other configuration is the same as in the first embodiment, the same components are denoted by the same reference signs and structures, functions and effects thereof are not described.

The first locking portion 81 of the fourth embodiment includes a cut-and-raised piece 82 formed by cutting a part of a first crimp portion 27 and raising the cut part radially inwardly. The cut-and-raised piece 82 projects in a circumferential direction from a tip part of the first locking portion 81 toward a base plate portion 26 and is bent to project further radially inward than the tip part of the first locking portion 81. A radially inward projection dimension of the cut-and-raised piece 82 from the first locking portion 81 is equal to a plate thickness of a second locking portion 38 of a second crimp portion 28.

With the crimping portion 80 crimped to a shielded cable 10, the first locking portion 81 is overlapped on the outer periphery of the second locking portion 38 and a part of the cut-and-raised piece 82 is accommodated in an opening 39 of the second locking portion 38. The projecting end edge of the cut-and-raised piece 82 butts against a second locking surface 40 of the opening 39 while being held in line contact with the second locking surface 40. By this butting, the first and second crimp portions 27, 28 are prevented from being expanded and deformed in the circumferential direction and a crimped state of the crimping portion 80 to the shielded cable 10 is maintained.

The first locking portion 81 is formed by cutting and raising a part of the first crimp portion 27 in a plate thickness direction of the first crimp portion 27. The shielded electrically conductive path D of the fourth embodiment can reduce manufacturing cost as compared to the case where a part flush with and extending from the outer peripheral edge of the first crimp portion 27 is bent.

Fifth Embodiment

Figure 10:
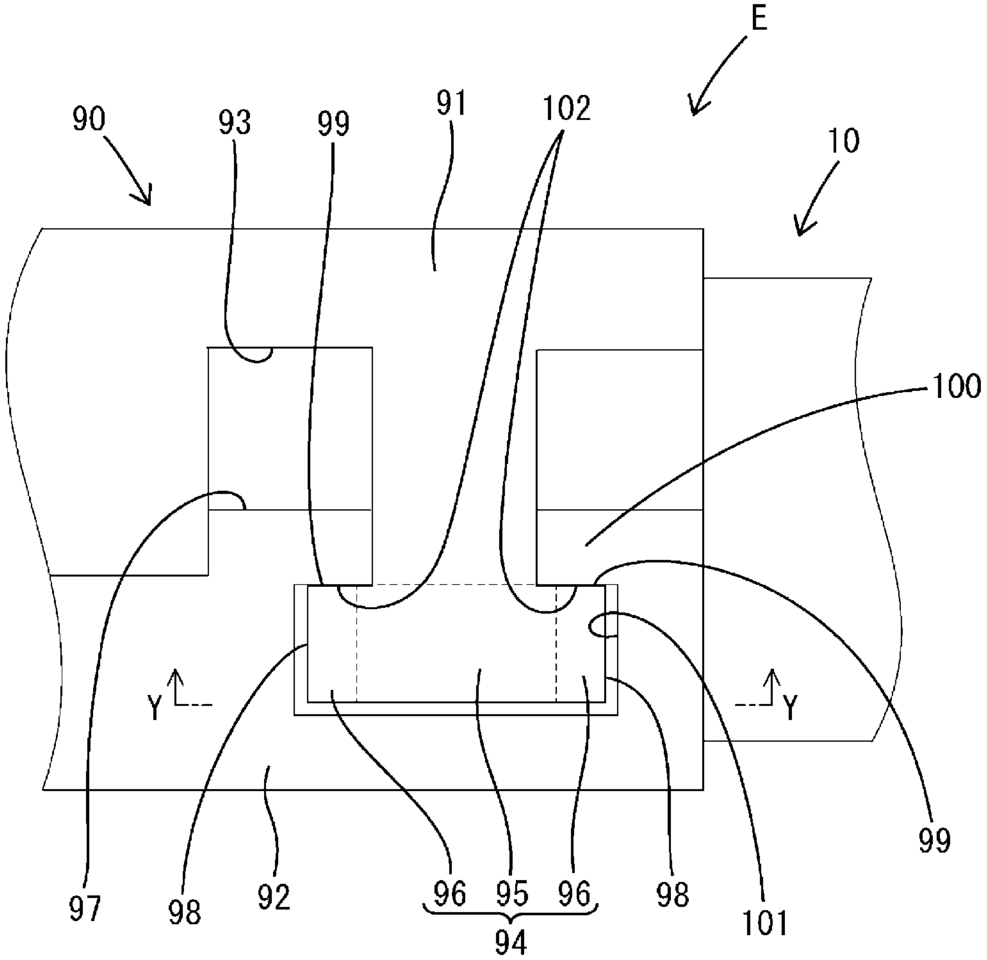
FIG. 10 is a partial plan view of a shielded electrically conductive path of a fifth embodiment.
Figure 11:
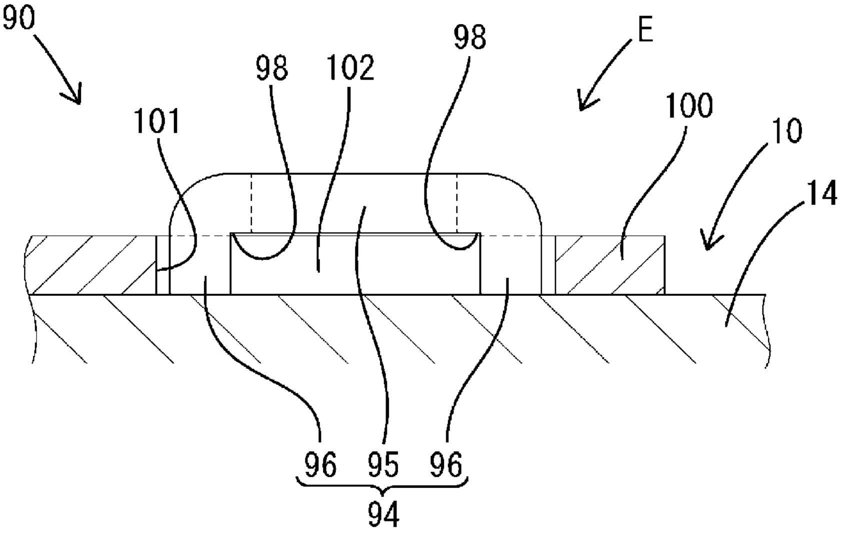
FIG. 11 is a section along Y-Y of FIG. 10.

A fifth specific embodiment of the present disclosure is described with reference to FIGS. 10 to 11. A shielded electrically conductive path E of the fifth embodiment differs from the first embodiment in the configuration of a crimping portion 90. Since the other configuration is the same as in the first embodiment, the same components are denoted by the same reference signs and structures, functions and effects thereof are not described.

The crimping portion 90 of the fifth embodiment includes a base plate portion (not shown), a first crimp portion 91 extending in one direction along a circumferential direction from the base plate portion and a second crimp portion 92 extending in a direction opposite to the first crimp portion 91 along the circumferential direction from the base plate portion.

A first extending end edge part 93 of the first crimp portion 91 is formed with a first locking portion 94. The first locking portion 94 includes a base portion 95 and a pair of front and rear bent portions 96. The base portion 95 is formed to project in the circumferential direction from a rear end part of the first extending end edge part 93 toward the second crimp portion 92. The base portion 95 is flush and continuous with the first crimp portion 91.

The pair of bent portions 96 are formed by bending front and rear end parts of the base portion 95 at a right angle. A boundary line between the base portion 95 and the bent portion 96, i.e. a folding line 98 of the bent portion 96, extends along the circumferential direction. The bent portion 96 is formed to project further radially inward than the inner peripheral surfaces of the base portion 95 and the first crimp portion 91. A radial projection dimension of the bent portion 86 is equal to plate thicknesses of the second crimp portion 92 and a second locking portion 100. A surface of the bent portion 96 facing the base plate portion in the circumferential direction functions as a first locking surface 99 orthogonal to the circumferential direction. The first locking portion 94 is in the form of a projection projecting radially inward from the first crimp portion 91.

A second extending end edge part 97 of the second crimp portion 92 is formed with the second locking portion 100. The second locking portion 100 projects in the circumferential direction from a rear end part of the second extending end edge part 97 toward the first crimp portion 91. The second locking portion 100 is flush and continuous with the second crimp portion 92. The second locking portion 100 includes a rectangular opening 101. The opening 101 is cut to penetrate through the second crimp portion 92 from an outer peripheral surface to an inner peripheral surface. The inner peripheral surface of the opening 101 has two inner side surfaces spaced apart in the circumferential direction of the crimping portion 90 and a front surface and a rear surface spaced apart in an axial direction. Out of the two inner side surfaces, the inner side surface closer to the first extending end edge part 93 functions as a second locking surface 102. The second locking surface 102 is arranged only within plate thickness ranges of the second crimp portion 92 and the second locking portion 100, facing toward the second crimp portion 92 and the base portion 95 in the circumferential direction, and orthogonal to the circumferential direction.

In a part of the crimping portion 90 crimped to a sheath 14, the first locking portion 94 is overlapped on the outer peripheral surface of the second locking portion 100. The both front and rear bent portions 96 are accommodated in the opening 101, and the first and second locking surfaces 99, 102 are in surface contact with each other in the circumferential direction. By a locking action achieved by the contact of the both locking surfaces 99, 102, the first and second crimp portion 91, 92 are held in a state not to be separated in the circumferential direction. In this way, the crimping portion 90 is reliably fixed to the outer periphery of a shielded cable. Since being formed by bending the first crimp portion 91 along the folding lines 98 extending in the circumferential direction, the first locking portion 94 has high rigidity against an external force in the circumferential direction. Therefore, the expansive deformation of the crimping portion 90 due to the deformation of the first locking portion 94 can be prevented.

Other Embodiments

The present invention is not limited by the above described and illustrated embodiments, but is represented by claims. The present invention is intended to include all changes in the scope of claims and in the meaning and scope of equivalents and also include the following embodiments.

Although the first and second crimp portions are formed with the displacement restricting portions in the above first embodiment, the first embodiment may not include the displacement restricting portions.

The displacement restricting portions of the above first embodiment may be formed in the second to fifth embodiments.

Although the second locking portion is in the form of a window hole having an opening edge continuous over an entire periphery in the above first to fifth embodiments, the second locking portion may be cut to be open in an outer edge part of the second crimp portion.

LIST OF REFERENCE NUMERALS

A . . . shielded electrically conductive path
B . . . shielded electrically conductive path
C . . . shielded electrically conductive path
D . . . shielded electrically conductive path
E . . . shielded electrically conductive path
10 . . . shielded cable
11 . . . core wire
12 . . . insulation coating
13 . . . shield layer
14 . . . sheath
15 . . . sleeve
20 . . . shield terminal
21 . . . inner conductor
22 . . . dielectric
23 . . . outer conductor
24 . . . body portion
25 . . . crimping portion
26 . . . base plate portion
27 . . . first crimp portion
28 . . . second crimp portion
29 . . . first extending end edge part
30 . . . second extending end edge part
31 . . . first locking portion
32 . . . base portion
33 . . . folded portion
34 . . . first locking surface
35 . . . first displacement restricting portion
36 . . . first protrusion
37 . . . first recess
38 . . . second locking portion
39 . . . opening
40 . . . second locking surface
41 . . . second displacement restricting portion
42 . . . second recess
43 . . . second protrusion
44 . . . stopper
50 . . . crimping portion
51 . . . base plate portion
52 . . . first crimp portion
53 . . . second crimp portion
54 . . . first extending end edge part
55 . . . first locking portion
56 . . . base portion
57 . . . folded portion
58 . . . first locking surface
59 . . . second extending end edge part
60 . . . second locking portion
61 . . . opening
62 . . . second locking surface
63 . . . front surface of opening
64 . . . rear surface of opening
70 . . . crimping portion
71 . . . first locking portion
72 . . . cut-and-raised piece
73 . . . bent portion
74 . . . butting portion
75 . . . first locking surface
80 . . . crimping portion
81 . . . first locking portion
82 . . . cut-and-raised piece
90 . . . crimping portion

91 . . . first crimp portion
92 . . . second crimp portion
93 . . . first extending end edge part
94 . . . first locking portion
95 . . . base portion
96 . . . bent portion
97 . . . second extending end edge part
98 . . . folding line
99 . . . first locking surface
100 . . . second locking portion
101 . . . opening
102 . . . second locking surface

What is claimed is:

1. A shielded electrically conductive path, comprising:

a shielded cable configured such that a core wire is surrounded with a shield layer and the shield layer is surrounded with a sheath; and a shield terminal including an inner conductor to be connected to the core wire and an outer conductor formed with a crimping portion in the form of an open barrel, the sheath being removed and the shield layer being exposed only in a region forward of a front end of the sheath in a front end part of the shielded cable, the crimping portion including a first crimp portion formed with a projection-like first locking portion and a second crimp portion formed with a second locking portion, the first locking portion being formed in a rear end part of the first crimp portion, the second locking portion being formed in a rear end part of the second crimp portion, regions of the first crimp portion and the second crimp portion forward of the first locking portion and the second locking portion being externally fit to an exposed part of the shield layer and the first locking portion and the second locking portion being locked in a circumferential direction while being externally fit to an outer peripheral surface of the sheath with the crimping portion crimped to the shielded cable, and a locking margin of the first locking portion and the second locking portion in a radial direction being within a plate thickness range of the second crimp portion.

2. The shielded electrically conductive path of claim 1, wherein the first locking portion is formed by bending a tip part of the first crimp portion into a folded state.

3. The shielded electrically conductive path of claim 1, wherein the first locking portion is formed by cutting and raising a part of the first crimp portion in a plate thickness direction of the first crimp portion.

4. The shielded electrically conductive path of claim 1, wherein the first locking portion is formed by bending the first crimp portion along a folding line extending in a circumferential direction.

5. The shielded electrically conductive path of claim 1, wherein the first crimp portion is layered on an outer peripheral side of the first crimp portion.

6. The shielded electrically conductive path of claim 1, wherein the first crimp portion and the second crimp portion are formed with displacement restricting portions capable of restricting relative displacements of the first crimp portion and the second crimp portion in an axial direction by coming into contact with each other, and the displacement restricting portions are externally fit to the region forward of the sheath where the shield layer is exposed.

* * * * *